Aug. 2, 1966 YOSHIAKI TAKEYA ETAL 3,264,101
METHOD OF MANUFACTURING SINTERED MATERIALS
Filed Aug. 13, 1963 3 Sheets-Sheet 1

INVENTORS
YOSHIAKI TAKEYA
MIKIO HIRANO
NOBUHIRO YARA
BY: Paul M. Craig, Jr.
ATTORNEY

METHOD OF MANUFACTURING SINTERED MATERIALS

INVENTORS
YOSHIAKI TAKEYA
MIKIO HIRANO
NOBUHIRO HARA
BY: Paul M. Craig, Jr.
ATTORNEY INVENTORS
YOSHIAKI TAKEYA
MIKIO HIRANO
NOBUHIRO HARA
BY: Paul M. Craig, Jr.
ATTORNEY United States Patent Office 3,264,101

Patented August 2, 1966

3,264,101

METHOD OF MANUFACTURING SINTERED MATERIALS

Yoshiaki Takeya, Kodaira-shi, and Mikio Hirano and Nobuhiro Hara, Tokyo, Japan, assignors to Hitachi, Ltd., Tokyo, Japan, a corporation of Japan Filed Aug. 13, 1963, Ser. No. 301,793
Claims priority, application Japan, Aug. 18, 1962, 37/35,772
4 Claims. (Cl. 75—204)

Figure 1A:
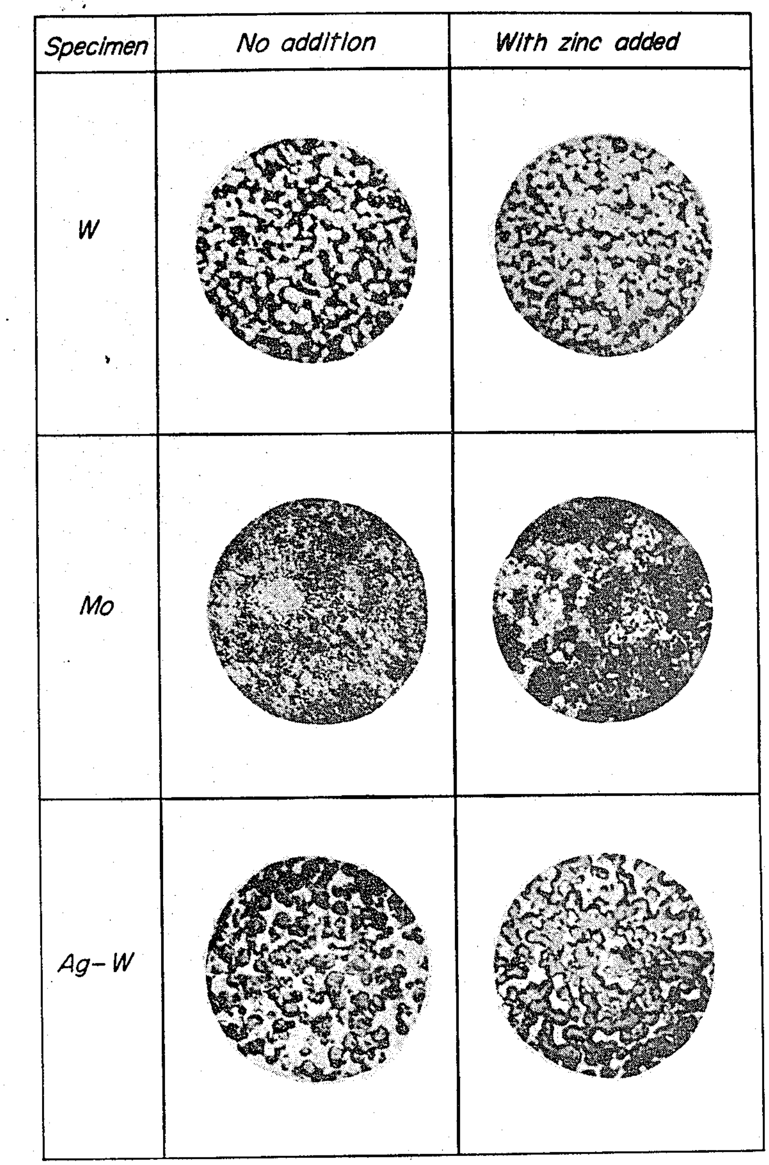

This invention relates to the manufacture of sintered materials and particularly those including molybdenum, tungsten or tungsten carbide.

Alloys composed of tungsten, molybdenum or tungsten carbide and silver or copper have long been used extensively, for example, as electrical contact materials for heavy currents. These alloys have been manufactured by powder metallurgy as tungsten, molybdenum and tungsten carbide have a very high melting point as compared with silver or copper and have a very limited or negligible solid solubility with respect to each other. In this connection, various methods have been used to obtain sintered alloys having improved performances. The sinterability of such materials can be improved by eliminating impurities such as oxides of the alloying elements in order to enhance the purity of the materials. In one method, the highest purity of hydrogen gas, which is conventionally used in the sintering process, is employed to prevent oxidation of the alloying elements, and, in another method, it is recommended to select metal powders of highest purities as sintering materials. These methods, however, are not effective to improve the sinterability of materials to any substantial extent and it follows that electrical contacts formed of alloys made by these methods do not exhibit any substantially improved performance. For example, contacts of Ag-W alloys made by these methods have exhibited an excessive temperature rise and hence increased contact resistance and liability to weld.

The present invention has for its object to eliminate these difficulties previously encountered in the case of sintering of molybdenum or tungsten, and molybdenum, tungsten and tungsten carbide base sintered alloys, particularly those suitable for electrical contact purposes. In the course of our investigation, we have discovered that by adding metals whose oxides have a high vapor pressure and moreover act as a reducing agent for the oxide of molybdenum or tungsten, such as zinc or cadmium or mixtures of these two, excellent sinterability of the above mentioned sintered materials can be obtained.

The process of this invention is as follows:

A mixture of the desired major constituent elements and zinc or cadmium is pressed into a compact and the compact then heated at a temperature above the melting point of the zinc or cadmium in a non-oxidizing atmosphere for several hours. It is then further heated at a temperature above the boiling point of zinc or cadmium, such as 1000° C. or higher, in the same atmosphere for several hours so as to reduce the amount of zinc or cadmium essentially to zero.

According to the present invention, the sinterability of the material is substantially improved as compared with any previous sintering method and an alloy can be obtained which has an increased density and hence exhibits a variety of improved characteristics.

Figure 1B:
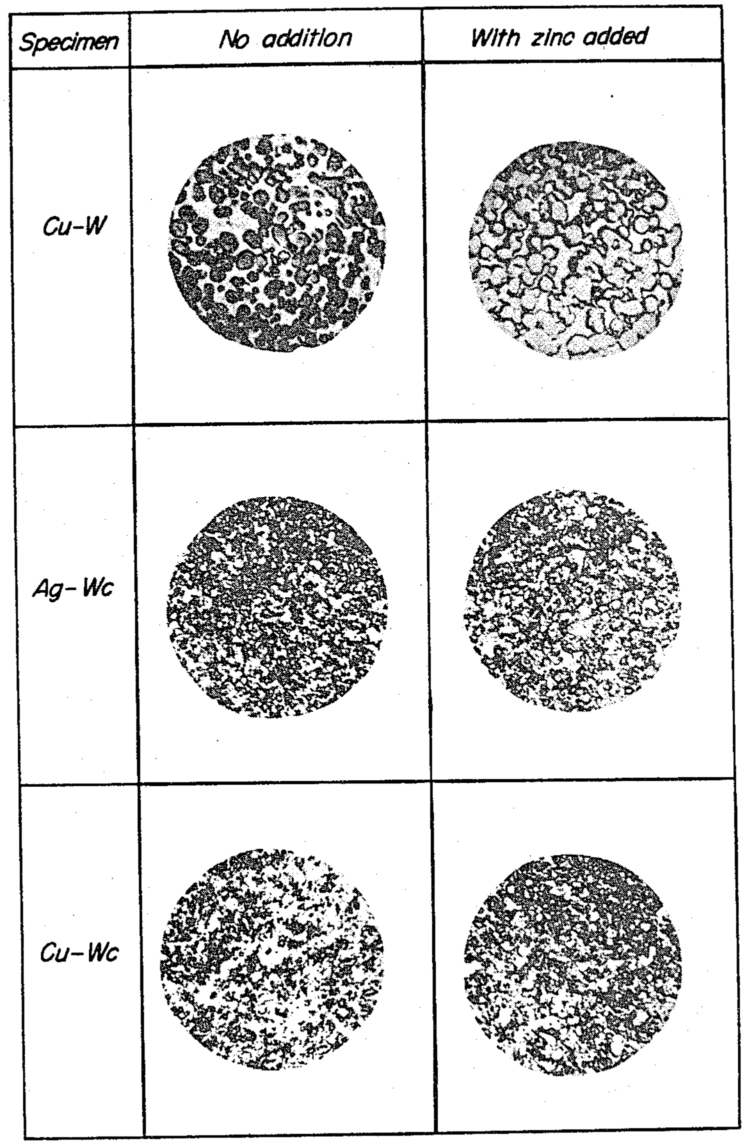
Figure 2:
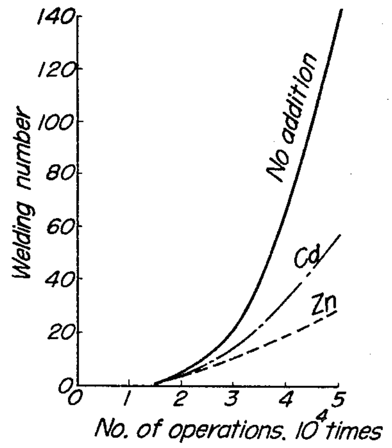
Figure 3:
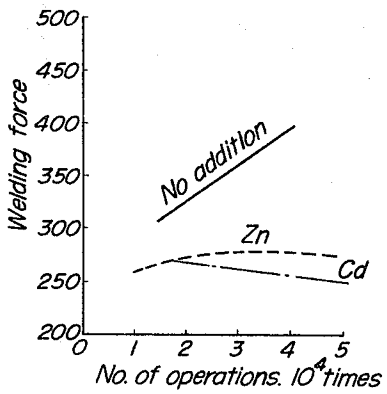
Figure 4:
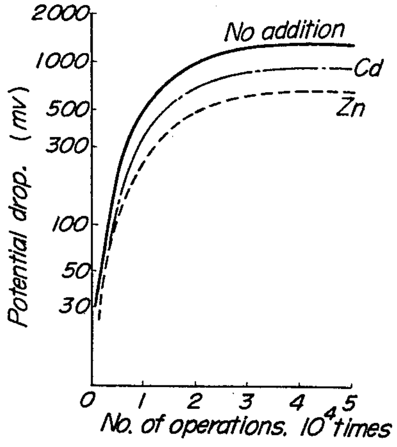
Figure 5:
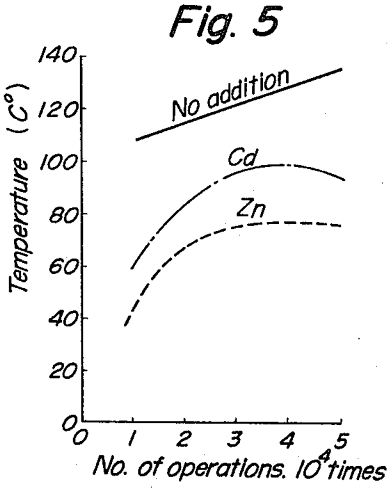

The present invention will now be described in detail with reference to the accompanying drawings, in which:

The left column of FIGS. 1*a* and 1*b* illustrate microstructures of a number of sintered alloys made according to the conventional method and the right column (of FIGS. 1*a* and 1*b*) illustrate those made according to the present invention; and FIGS. 2 to 5 represent performance charts of electrical contacts formed from a Ag-W alloy made according to the present invention and from a similar alloy made according to the conventional method.

In one practical example of the present method, a powder of W or Mo or a mixture of a W or WC powder and a Ag or Cu powder is thoroughly mixed with 5% of Zn or Cd powder. The resulting mixture is pressure-molded under a pressure of 20 tons/cm.$^2$ and then heated for one hour in a hydrogen atmosphere at 800° C. when zinc is added and at 650° C. when cadmium is added, and further heated at 1250° C. for 2 hours to complete presintering. The presintered piece is subjected to a pressure, this time of 10 tons/cm.$^2$, and then heated again at 1250° C. for 2 hours in a hydrogen atmosphere to finally complete the sintering process.

In FIGS. 1*a* and 1*b*, there are shown microstructures of W, Mo, Ag-W, Cu-W, Ag-WC and Cu-WC base sintered alloys made by the procedure just described from materials including 5% zinc and conventional alloys made by the same procedure but with no zinc added. As apparent from these figures, many of the W, Mo or WC particles are observed remaining individual and distinct from each other in each of the conventional alloys whereas in those alloys including 5% zinc added according to the present invention, W, Mo or WC particles are linked together in a chain form exhibiting a highly improved sinterability.

The following table lists the densities of Ag-W alloys made by the above procedure with or without addition of zinc or cadmium.

TABLE

| Additive: | Density (gr.cm.$^{-3}$) |
|---|---|
| None | 14.5–15.2 |
| Zinc | 15.1–15.3 |
| Cadmium | 15.0–15.3 |

Electrical contacts made of these alloys exhibited performances as shown in FIGS. 2 to 5. The performance tests were conducted with a contact testing machine for heavy currents as specified in the ASTM standards. The test conditions included 100 V.–50 A. (50 c.p.s.) resistance load, 400 gr. closing force, 200 gr. opening force, and 3.8 cm./sec. closing and opening speed. FIGS. 2 to 5 illustrate the relationships between the number of contacting operations and the welding number, welding force, fall of the potential and contact temperatures, respectively. As will readily be observed from these test results, the contacts obtained according to the present method have performances much improved over those of contacts made by the conventional method.

It will readily be appreciated from the foregoing that sintered alloys made according to the present invention have an increased density and hence a variety of excellent characteristics and are very valuable, particularly for use in electrical contacts.

What is claimed is:

1. A process for manufacturing molybdenum, tungsten and tungsten carbide sintered materials which comprises mixing an element selected from the group consisting of zinc, cadmium and mixtures thereof with a sinterable material consisting essentially of one of the substances molybdenum, tungsten and tungsten carbide, pressing the resultant mixture into a compact, heating said compact to a temperature above the melting point of said element but below the boiling point thereof, and then further heating the compact to a temperature above the boiling point of said element until the content of said element is essentially reduced to zero.

2. The process of claim 1, wherein said sinterable material additionally consists of silver.

3. The process of claim 1, wherein said sinterable material additionally consists of copper.

4. The process of claim 1, wherein said heating steps are carried out in the presence of a nonoxidizing atmosphere.

References Cited by the Examiner

UNITED STATES PATENTS

| | | | |
|---|---|---|---|
| 1,034,949 | 8/1912 | Arsen | 75—221 X |
| 1,531,666 | 3/1925 | Laise | 75—226 X |
| 1,636,763 | 7/1927 | Boving | 75—223 X |
| 2,030,229 | 2/1936 | Schwarzkopf | 75—211 |
| 2,179,960 | 11/1939 | Schwarzkopf | 75—211 |
| 2,360,522 | 10/1944 | Shobert et al. | 75—223 X |

LEON D. ROSDOL, *Primary Examiner.*

CARL D. QUARFORTH, REUBEN EPSTEIN, *Examiners.*

R. L. GRUDZIECKI, R. L. GOLDBERG, *Assistant Examiners.*